US012544414B2

(12) United States Patent
Duan et al.

(10) Patent No.: US 12,544,414 B2
(45) Date of Patent: Feb. 10, 2026

(54) LACTOBACILLUS REUTERI AND USE, COMPOSITION, DRUG AND FOOD THEREOF

(71) Applicant: Wisbiom (Beijing) Biotechnology Co., Ltd., Beijing (CN)

(72) Inventors: Yunfeng Duan, Beijing (CN); Ye Zhang, Beijing (CN); Hua Liang, Beijing (CN); Lei Cui, Beijing (CN); Zhi Liu, Beijing (CN)

(73) Assignee: WISBIOM (BEIJING) BIOTECHNOLOGY CO., LTD., Beijing (CN)

( * ) Notice: Subject to any disclaimer, the term of this patent is extended or adjusted under 35 U.S.C. 154(b) by 39 days.

(21) Appl. No.: 18/287,028

(22) PCT Filed: Apr. 13, 2022

(86) PCT No.: PCT/CN2022/086583
§ 371 (c)(1),
(2) Date: Oct. 16, 2023

(87) PCT Pub. No.: WO2022/218335
PCT Pub. Date: Oct. 20, 2022

(65) Prior Publication Data
US 2024/0197796 A1    Jun. 20, 2024

(30) Foreign Application Priority Data

Apr. 16, 2021 (CN) .......................... 202110412519.0

(51) Int. Cl.
| | | |
|---|---|---|
| *A61K 35/747* | (2015.01) | |
| *A23C 9/123* | (2006.01) | |
| *A61K 35/00* | (2006.01) | |
| *A61P 1/14* | (2006.01) | |
| *A61P 37/08* | (2006.01) | |
| *C12N 1/20* | (2006.01) | |
| *C12R 1/225* | (2006.01) | |

(52) U.S. Cl.
CPC .......... *A61K 35/747* (2013.01); *A23C 9/1234* (2013.01); *A61P 1/14* (2018.01); *A61P 37/08* (2018.01); *C12N 1/205* (2021.05); *A23V 2400/173* (2023.08); *A61K 2035/115* (2013.01); *C12R 2001/225* (2021.05)

(58) Field of Classification Search
CPC ... A61K 35/747; A61K 2035/115; A61P 1/14; A61P 1/00; A61P 25/00; C12N 1/205; A23V 2400/173; A23V 2002/00; A23V 2200/304; A23V 2200/3204; C12R 2001/225; A23L 33/135
See application file for complete search history.

(56) References Cited

U.S. PATENT DOCUMENTS

| | | | |
|---|---|---|---|
| 9,567,361 B2* | 2/2017 | Newburg | ................ A23L 33/40 |
| 2015/0335688 A1* | 11/2015 | Coulson | ................ A61K 31/205 |
| | | | 424/93.3 |
| 2019/0070226 A1 | 3/2019 | Costa-Mattioli et al. | |

FOREIGN PATENT DOCUMENTS

| | | |
|---|---|---|
| CN | 1668211 A | 9/2005 |
| CN | 104244736 A | 12/2014 |
| CN | 106619743 A | 5/2017 |
| CN | 106794207 A | 5/2017 |
| CN | 107427528 A | 12/2017 |
| CN | 107523526 A | 12/2017 |
| CN | 109195612 A | 1/2019 |
| CN | 110613738 A | 12/2019 |
| CN | 111265553 A | 6/2020 |
| CN | 111372596 A | 7/2020 |
| CN | 111465684 A | 7/2020 |
| CN | 110643542 B | 1/2021 |
| CN | 112204129 A | 1/2021 |
| CN | 109628359 B | 3/2021 |
| CN | 113073066 A | 7/2021 |
| CN | 113180109 A | 7/2021 |
| JP | 2006506371 A | 2/2006 |
| JP | 2006516406 A | 7/2006 |
| JP | 2006254820 A | 9/2006 |

OTHER PUBLICATIONS

Kong et al. The Effects of Limosilactobacillus reuteri LR-99 Supplementation on Body Mass Index . . . , Probiotics and Antimicrobial Proteins (Jun. 11, 2021) 13:1508-1520 (Year: 2021).*
The First Office Action for Chinese Application No. 202110412519. 0, dated Aug. 13, 2021, 14 pages.
The International search report for PCT Application No. PCT/CN2022/086583, dated Jul. 18, 2022, 13 pages.
Shelly A. Buffington et al. Microbial Reconstitution Reverses Maternal Diet-Induced Social and Synaptic Deficits in Offspring, Cell, vol. 165, dated Jun. 16, 2016, 14 pages.
Huiyu Wang et al. The potential therapeutic role of Lactobacillus reuteri for treatment of inflammatory bowel disease, Am J Transl Res., vol. 12, No. 5, dated May 15, 2020, 15 pages.
The First Office Action for the GB Application No. 2317588.8, dated Oct. 31, 2024, 2 pages.
The First Office Action for the Japanese Application No. 2023-563259, dated Dec. 3, 2024, 9 pages.
Wang, Huiyu et al. "The potential therapeutic role of Lactobacillus reuteri for treatment of imflammatory bowel disease, American Journal of Translational Research vol. 12, No. 5, pp. 1569-1583", dated May 15, 2020, 16 pages.

(Continued)

*Primary Examiner* — Louise W Humphrey
*Assistant Examiner* — Alexander M Duryee
(74) *Attorney, Agent, or Firm* — East IP P.C.

(57) ABSTRACT

The present invention relates to a *Lactobacillus reuteri*, and use, composition, drug and food thereof. The *Lactobacillus reuteri* has an accession number of CGMCC No. 21577, can improve intestinal flora disorder, reduce intestinal injury, improve intestinal permeability and promote immune system recovery, and has effects of treating or preventing allergic reactions of nervous system-related diseases such as autism, hyperactivity, tics, depression, etc.

7 Claims, 6 Drawing Sheets

Specification includes a Sequence Listing.

(56) References Cited

OTHER PUBLICATIONS

Anjum, Jasia et al. "Specific Bacteria Isolated From Human Breast Milk Bolster Intestinal Epithelial Barrier Function, and Ameliorate Dysfunction Induced by *Salmonella enterica* Infection Gastroenterology, vol. 158, No. 6, Article S-556", May 2020, 2 pages.

Karimi, Shokoufeh et al., "Lactobacillus reuteri strains protect epithelial barrier integrity of IPEC-J2 monolayers from the detrimental effect of enterotoxigenic *Escherichia coli* Physiological Reports, vol. 6, No. 2, Article e13514", Jan. 2018, 13 pages.

* cited by examiner

LACTOBACILLUS REUTERI AND USE, COMPOSITION, DRUG AND FOOD THEREOF

CROSS REFERENCE TO RELATED APPLICATIONS

This application is a National Stage of International Application No. PCT/CN2022/086583, filed on Apr. 13, 2022, which claims priority to Chinese Patent Application No. 202110412519.0, filed on Apr. 16, 2021, both of which are hereby incorporated by reference in their entireties.

TECHNICAL FIELD

The present invention relates to the technical field of microorganisms, and in particular to a *Lactobacillus reuteri*, and use, composition, drug and food thereof.

BACKGROUND

An allergic reaction refers to a reaction of tissue damage or dysfunction that occur when an immunized organism receives the same antigen stimulation again. All over the world, the number of allergic population is increasing. In a certain population, the incidence of food allergy in children is up to 10%.

The idea that early exposure to microorganisms can have a positive impact on immune health of human body can be traced back to at least 1989, at which time David Strachan, an epidemiologist at the London School of Hygiene & Tropical Medicine, put forward the "hygiene hypothesis", arguing that children growing up in smaller and cleaner families are more likely to suffer from allergies. In the following decades, the health hypothesis has evolved into a model centered on a micropopulation. In this model, early exposure to microorganisms from home and environment plays a key role in reducing the risk of inflammatory diseases such as asthma, hay fever eczema and the like, as well as food allergy. Currently, the "hygiene hypothesis" has gradually evolved into the theory that "the early environment affects the microflora, thereby leading to immune dysfunction". In the early life stage, intestinal dysbacteriosis, such as low diversity and high ratio of enterobacteria/bacteroidetes, will produce a great impact on allergies. Metabolites of intestinal flora are important mediators between flora and a host, which can inhibit the inflammatory response of an immune system to an allergen by interacting with the immune system, or inhibit an allergen from crossing an intestinal barrier by reducing intestinal permeability, thereby promoting immune tolerance.

Allergies caused by disorder of intestinal flora may play a role by increasing intestinal permeability. It has been found by some studies that infants with food allergy will have intestinal leakage, which is manifested by the increase of the antigens and allergens in the blood transferred from the intestine. The interior of a digestive tract is usually not monitored immunologically, but if the permeability of the intestinal barrier is increased, a protein derived from a food will be leaked into the body and cause the allergic reaction. Some foods that cause allergies in children, such as indigestible proteins in peanuts and milk, are likely to pass through a damaged intestinal barrier in perfect condition and trigger an immune response. It has been found by some researches that when the intestinal flora of mice is treated with an antibiotic and then the mice are fed with peanuts, complete peanut proteins can be found in the blood of these mice.

*Lactobacillus reuteri* is a *lactobacillus* existed in the intestinal tract. As a probiotic, it has very strong adhesion to intestinal mucosa, also has excellent acid resistance, cholate tolerance and broad-spectrum bacteriostatic properties, and can widely inhibit the growth of gram-positive bacteria, gram-negative bacteria, yeasts, fungi and protozoan.

SUMMARY

According to researches of the present application, it has been found that a *Lactobacillus reuteri* (with an accession number of CGMCC No. 21577) isolated from the milk of a healthy woman can improve intestinal flora disorder, reduce intestinal injury, improve intestinal permeability and promote immune system recovery, and has effects of treating or preventing allergic reactions.

Therefore, the present application provides a *Lactobacillus reuteri* with an accession number of CGMCC No. 21577.

Furthermore, the present application further provides use of the aforementioned *Lactobacillus reuteri* in the preparation of a product for preventing or treating allergic reactions.

Furthermore, the present application further provides a composition including the aforementioned *Lactobacillus reuteri* and/or a fermentation product of the aforementioned *Lactobacillus reuteri*.

Furthermore, the present application further provides a drug, wherein a raw material for preparing the drug includes the aforementioned *Lactobacillus reuteri* or the aforementioned composition, and a pharmaceutically acceptable excipient.

Furthermore, the present application further provides a food, wherein a raw material for preparing the food includes the aforementioned *Lactobacillus reuteri* or the aforementioned composition.

Furthermore, the present application further provides a method for preparing the aforementioned *Lactobacillus reuteri*, wherein the *Lactobacillus reuteri* is prepared by high-density fermentation, and the preparation method includes the following steps:

activating the *Lactobacillus reuteri*; and inoculating the activated *Lactobacillus reuteri* into a fermentation tank for fermentation culture.

Furthermore, the present application further provides use of the aforementioned *Lactobacillus reuteri* in the preparation of a product for preventing or treating intestinal flora disorder; or use of the aforementioned *Lactobacillus reuteri* in the preparation of a product for preventing or treating intestinal leakage.

Furthermore, the present application further provides a method for preventing or treating intestinal leakage and/or allergic reactions, which includes taking the aforementioned composition or a product prepared from the aforementioned composition as a raw material at a dosage of $3.0 \times 10^6$ CFU/kg body weight/day to $1.2 \times 10^{11}$ CFU/kg body weight/day, based on the number of probiotics in the composition.

Details of one or more embodiments of the present application are set forth in the following accompanying drawings and descriptions, and other features, objectives and advantages of the present application will become apparent from the description, accompanying drawings and claims.

DESCRIPTION OF THE DRAWINGS

In order to better describe and illustrate the embodiments and/or examples of those inventions disclosed herein, reference may be made to one or more accompanying drawings. Additional details or examples used for describing the accompanying drawings should not be considered as limiting the scope of any of the disclosed inventions, currently described embodiments and/or examples, and the best modes for implementing these inventions as currently understood.

Figure 1:
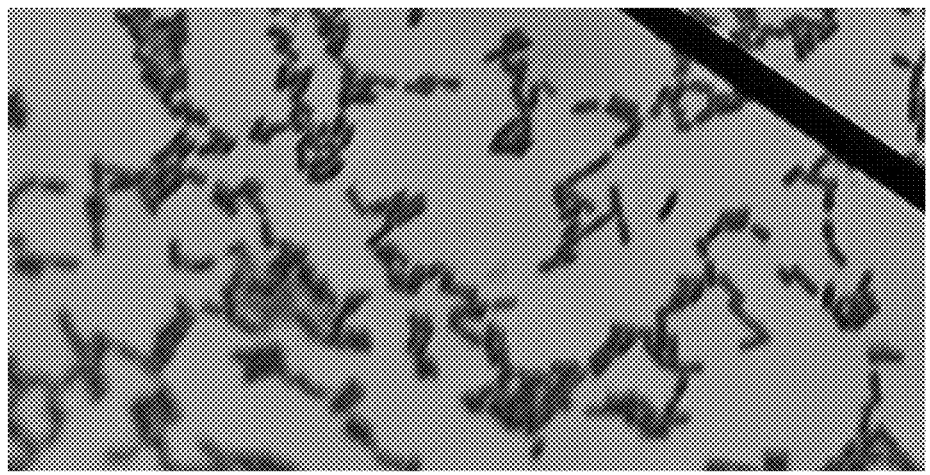
FIG. 1 is a diagram of a *Lactobacillus reuteri* LR99 in Example 1 observed under a microscope.

The *Lactobacillus reuteri* provided by the present application with a strain name of LR99, is deposited in China General Microbiological Culture Collection Center at the address of: Institute of Microbiology, Chinese Academy of Sciences, No. 3 1st Beichen West Rd., Chaoyang District, Beijing, with the accession number of CGMCC No. 21577. The strain was received and registered by the collection center on Dec. 31, 2020, and was detected as a viable strain by the collection center on Dec. 31, 2020.

DETAILED DESCRIPTION

In order to facilitate the understanding of the present invention, the present invention will be described more fully hereafter. The present invention can be realized in many different forms in and is not limited to the embodiments described herein. On the contrary, these embodiments are provided to make the present invention more thorough and comprehensive.

Unless otherwise defined, all technical and scientific terms used herein have the same meanings as those commonly understood by those skilled in the art to which the present invention pertains to. Herein, the terminology used in this specification of the present invention is only for the purpose of describing specific examples, and is not intended to limit the present invention.

An embodiment of the present invention provides a *Lactobacillus reuteri* No. LR99, which is isolated from the milk of a healthy woman. It has been deposited on Dec. 31, 2020 in the China General Microbiological Culture Collection Center (abbreviated as CGMCC, address: Institute of Microbiology, Chinese Academy of Sciences, No. 3 1st Beichen West Rd., Chaoyang District, Beijing, 100101), classified and named as *Lactobacillus reuteri*, with the accession number of CGMCC No. 21577.

It is verified that the aforementioned *Lactobacillus reuteri* can reprogram endothelial CD4+ T cells into immunoregulatory T cells, play an immunomodulatory role, promote the increase of Treg cells, and reduce a Th2 response, thereby facilitating intervention, relieving or prevention of allergic reactions and promoting the recovery of an immune system. Moreover, the aforementioned *Lactobacillus reuteri* also has the ability to metabolize tryptophan, and its tryptophan metabolites can improve the barrier function of an intestinal tract, inhibit the increase of intestinal barrier permeability, and reduce intestinal damage, prevent or alleviate intestinal leakage, and can further prevent or alleviate allergic reactions. Moreover, the aforementioned *Lactobacillus reuteri* can further improve the diversity of intestinal flora, increase the number of intestinal probiotics (e.g., *Lactobacillus*, *Bifidobacterium* and Akkermansia, etc.), and improve the disorder of intestinal flora.

Based on this, an embodiment of the present invention provides use of the aforementioned *Lactobacillus reuteri* in the preparation of a product for preventing or treating allergic reactions. Optionally, the product is used for preventing or treating allergic diseases accompanying nervous system development disorder and/or emotional disorder. Specifically, the nervous system development disorder is autism spectrum disorder (ASD) or tic; and the emotional disorder includes hyperactivity and depression. Allergic diseases can occur at all ages from newborns to the elderly, and often have obvious genetic tendency. In the allergic diseases, immediate hypersensitivity is more common, of which the main types are cutaneous anaphylaxis, respiratory tract anaphylaxis, digestive tract anaphylaxis and allergic shock, etc.

Based on the aforementioned functions of the aforementioned *Lactobacillus reuteri*, an embodiment of the present invention further provides use of the aforementioned *Lactobacillus reuteri* in the preparation of a product for preventing or treating intestinal leakage.

Based on the aforementioned functions of the aforementioned *Lactobacillus reuteri*, an embodiment of the present invention further provides use of the aforementioned *Lactobacillus reuteri* in the preparation of a product for preventing or treating disorder of intestinal flora.

An embodiment of the present invention further provides a method for preparing the aforementioned *Lactobacillus reuteri*, which adopts high-density fermentation to prepare the aforementioned *Lactobacillus reuteri*. Specifically, the preparation method includes steps S1-S3. S1. the aforementioned *Lactobacillus reuteri* is activated.

Specifically, the *Lactobacillus reuteri* is subjected to three times of activation culture each at a temperature of 37° C. for a time of 16 h-18 h to improve the strain viability.

S2. the activated *Lactobacillus reuteri* is inoculated into a fermentation tank for fermentation culture.

An improved MRS culture medium is sterilized and then cooled to 37° C., inoculated into a fermentation tank with an inoculation amount of 2.5%-3.5% (v/v) for fermentation, and the pH and OD value of a fermentation broth are detected every hour. When the fermentation is conducted until the pH and OD value are relatively flat, it indicates that the strain reaches the end of a logarithmic phase and is about to enter a stable phase, and the fermentation was completed. Then the fermentation broth was cooled, and centrifuged at a low temperature. The bacterial cells are collected and washed with a phosphate buffer solution (PBS) to prepare bacterial cells of the *Lactobacillus reuteri*.

S3. the bacterial cells prepared in the step S2 are freeze-dried to prepare freeze-dried powder.

Specifically, the bacterial cells prepared in the step S2 are mixed with a lyoprotectant, then emulsified, and then freeze-dried under vacuum to prepare freeze-dried powder. Optionally, the lyoprotectant is selected from at least one of skimmed milk powder, trehalose, fructooligosaccharide, lactose, glucose, sucrose, sodium L-ascorbate, L-malic acid and L-lactic acid. Of course, in other embodiments, the lyoprotectant is not limited to the above, and can also be other substances that can maintain the activity of the bacterial cells during freeze-drying. Optionally, a volume ratio of the bacterial cells to the lyoprotectant is 1:(2-10).

It can be understood that in some embodiments, the step S3 may be omitted. At this time, the bacterial cells of the *Lactobacillus reuteri* are prepared.

The method for preparing the aforementioned *Lactobacillus reuteri* adopts high-density fermentation to prepare the aforementioned *Lactobacillus reuteri* with high yield.

Moreover, based on the aforementioned functions of the aforementioned *Lactobacillus reuteri*, an embodiment of the present invention further provides a composition comprising the aforementioned *Lactobacillus reuteri* and/or a fermentation product of the aforementioned *Lactobacillus reuteri*.

Specifically, the fermentation product of the aforementioned *Lactobacillus reuteri* refers to a culture product of the aforementioned *Lactobacillus reuteri*, including at least one of metabolites located in the bacterial cells and metabolites secreted outside the bacterial cells. When in use, the culture solution after the culture of the aforementioned *Lactobacillus reuteri* or freeze-dried powder obtained after freeze-drying the culture solution, is taken. Alternatively, the lysate obtained by lysis after the culture of the aforementioned *Lactobacillus reuteri* or freeze-dried powder obtained by purifying and freeze-drying the lysate, is taken.

In some embodiments, the aforementioned composition includes the aforementioned *Lactobacillus reuteri* and an excipient required for preparing a bacterial agent. The active ingredients of the aforementioned composition include the aforementioned *Lactobacillus reuteri*. In an alternative specific example, the aforementioned composition includes the aforementioned *Lactobacillus reuteri* and a lyoprotectant. The lyoprotectant is as described above and will not be described here anymore.

In some embodiments, the aforementioned composition further includes other probiotics. The probiotics are also used as the active ingredients of the aforementioned composition. That is, the aforementioned composition includes active ingredients including the aforementioned *Lactobacillus reuteri* and other probiotics. Optionally, the other probiotics are selected from at least one of *Lactobacillus, Bifidobacterium, Streptococcus thermophilus, Lactococcus, Propionibacterium, Leuconostoc, Staphylococcus, Bacillus, Pediococcus, Escherichia.coli* (e.g., Nissle 1917), *Prevotella, Faecalibacterium*, Blautia, Bacteroidetes, Firmicutes, and a yeast.

In an alternative specific example, *Lactobacillus* is selected from at least one of *Lactobacillus plantarum, Lactobacillus fermentum, Lactobacillus acidophilus, Lactobacillus casei, Lactobacillus crispatus, Lactobacillus bulgaricus, Lactobacillus delbrueckii* subsp. *Lactis, Lactobacillus gasseri, Lactobacillus johnsonii, Lactobacillus paracasei, Lactobacillus reuteri, Lactobacillus rhamnosus, Lactobacillus salivarius, Lactobacillus sakei*, and *Lactobacillus helveticus*.

In an alternative specific example, *Bifidobacterium* is selected from at least one of *Bifidobacterium adolescentic, Bifidobacterium breve, Bifidobacterium longum, Bifidobacterium infantis, Bifidobacterium bifidum, Bifidobaterium animalis* and *Bifidobaterium lactis*.

In an alternative specific example, *Lactococcus* is selected from at least one of *Lactococcus Lactis* subsp. *Lactis, Lactococcus Lactis* subsp. *Cremoris*, and *Lactococcus Lactis* subsp. Diacetylactis.

In an alternative specific example, *Propionibacterium* is selected from at least one of *Propionibacterium freudenreichii* subsp. *Shermanii* and *Propionibacterium acidipropionici*. *Leuconostoc* is *Leuconostoc mesenteroides* subsp. *Mesenteroides*. *Pediococcus* is selected from at least one of *Pediococcus acidilactici* and *Pediococcus pentosaceus*. *Staphylococcus* is selected from at least one of *Staphylococcus vitulinus, Staphylococcus* xylosus and *Staphylococcus carnosus*. *Bacillus* is *Bacillus coagulans*. The yeast is selected from at least one of *Kluyveromyces marxianus, Saccharomyces cerevisiae, Cadida atilis, Kluyveromyces lactis* and *Saccharomyces carlsbergensis*. It can be understood that the other probiotics in this embodiment are not limited to the above, and may be probiotics other than other LR99.

In some embodiments, the aforementioned composition further includes a prebiotic. Through the prebiotic, the colonization and reproduction of the aforementioned *Lactobacillus reuteri* are promoted, and meanwhile the growth of other probiotics in the intestinal tract is also promoted. Optionally, the prebiotic is selected from at least one of inulin, an artichoke extract, a chicory root extract, a jerusalem artichoke root extract, a fructooligosaccharide, a galactooligosaccharide, an isomaltooligosaccharide, a xylooligosaccharide, a stachyose, a mannose oligosaccharide, an arabinose oligosaccharide, resistant dextrin and resistant starch. Of course, in other embodiments, the prebiotic in the aforementioned composition is not limited to the above, but can also be other substances that can promote the growth and reproduction of probiotics.

In some embodiments, the aforementioned composition further includes a nutrient selected from at least one of GABA, tryptophan, lycopene, β-carotene, vitamin B6, vitamin B12, coenzyme Q10, taurine, pectin, β-glucan, fucose, carrageenan, guar gum, citrus fiber, apple fiber, *Chlorella fusca*, alfalfa powder, green juice powder and dietary fiber.

In some embodiments, the aforementioned composition further includes an antioxidant. Specifically, the antioxidant is selected from at least one of tocopherol, carotenoid, ascorbic acid/vitamin C, ascorbyl palmitate, polyphenol, glutathione and superoxide dismutase.

In some embodiments, in the aforementioned composition, the mass percentage of the aforementioned *Lactobacillus reuteri* is 1%-30%. Further, the mass percentage of the aforementioned *Lactobacillus reuteri* is 1%-20%. Optionally, in the aforementioned composition, the living bacteria content of the aforementioned *Lactobacillus reuteri* is $1.2 \times 10^6$ CFU/g-$1.6 \times 10^{12}$ CFU/g. Further, the living bacteria content of the aforementioned *Lactobacillus reuteri* is $3.0 \times 10^{10}$ CFU/g-$2.0 \times 10^{11}$ CFU/g.

In some embodiments, the *Lactobacillus reuteri* in the aforementioned composition is a living bacterium. In some other embodiments, the *Lactobacillus reuteri* in the aforementioned composition is inactivated bacterial cells of *Lactobacillus reuteri*. In some other embodiments, the *Lactobacillus reuteri* in the aforementioned composition is a mixture of living *Lactobacillus reuteri* and inactivated *Lactobacillus reuteri*.

The dosage form of the aforementioned composition is not particularly limited, and can be, for example, powder, a lozenge, a tablet or a capsule, etc.

In some embodiments, in parts by weight, the aforementioned composition includes 10-30 parts of freeze-dried powder of *Lactobacillus reuteri*, 15-25 parts of fructooligosaccharide, 40-65 parts of sorbitol or maltitol, and 5-10 parts of magnesium stearate, wherein the content of *Lactobacillus reuteri* in the aforementioned composition is $1.2 \times 10^6$ CFU/g-$1.5 \times 10^6$ CFU/g.

In some embodiments, in parts by weight, the aforementioned composition includes 0.5-30 parts of freeze-dried powder of *Lactobacillus reuteri* LR99, 1-20 parts of other probiotics, 20-80 parts of prebiotics, 2-10 parts of a nutrient, and 0.1-10 parts of an antioxidant. Other probiotics, prebiotics, nutrients and antioxidants are as mentioned above, and will not be described here anymore. Further, the aforementioned composition includes 1-10 parts of freeze-dried powder of *Lactobacillus reuteri* LR99, 1-10 parts of other probiotics, 30-80 parts of prebiotics, 2-5 parts of a nutrient and 0.5-10 parts of an antioxidant. Optionally, in the aforementioned composition, the content of *Lactobacillus reuteri* is $1.8 \times 10^6$ CFU/g-$6.5 \times 10^{11}$ CFU/g, and the content of individual bacteria of other probiotics is $1 \times 10^6$ CFU/g-$6 \times 10^9$ CFU/g. Further, the content of the *Lactobacillus reuteri* is $2.5 \times 10^7$ CFU/g-$1 \times 10^{11}$ CFU/g.

The aforementioned composition including the aforementioned *Lactobacillus reuteri* and/or a fermentation product of the aforementioned *Lactobacillus reuteri*, can improve the diversity of intestinal flora, increase the number of intestinal probiotics (e.g. *Lactobacillus, Bifidobacterium* and *Akkermansia*, etc.), improve the disorder of intestinal flora, and reduce intestinal injury, and can prevent or alleviate intestinal leakage and allergic reactions, and promote the recovery of an immune system.

The aforementioned composition can be used as a raw material for preparing a food, drug, health care product or animal feed. For example, it can be used as a raw material for preparing fermented milk, cheese, milk-containing beverage, solid beverage, milk powder, tablet candy, jelly sweet, fermented fruit and vegetable juice, a fermented bean product and the like foods. When in use, a final product is made by direct mixing or after fermentation according to a conventional process. It can be understood that in some embodiments, the aforementioned composition can also be directly used as a food or drug. Alternatively, in a food, the recommended dosage of the aforementioned *Lactobacillus reuteri* for human use is $1.0 \times 10^3$ CFU/kg body weight/day-$1.0 \times 10^{10}$ CFU/kg body weight/day. Further, the recommended dosage of the aforementioned *Lactobacillus reuteri* for human use is $1.0 \times 10^4$ CFU/kg body weight/day-$1.0 \times 10^9$ CFU/kg body weight/day.

An embodiment of the present invention further provides a food, and a raw material for preparing the food includes the aforementioned *Lactobacillus reuteri* or the aforementioned composition, and a food additive. Optionally, the food additive is selected from at least one of a flavoring agent, a sweetening agent, a thickener, a stabilizer, a surfactant, a lubricant, an acidic neutralizer, a dispersant, a buffer solution or buffer agent, a debittering agent, a pH stabilizer, a preservative, a desugar and a colorant. In a specific example, the food additive is selected from at least one of lactitol, sorbitol, maltitol, aspartame, *Stevia rebaudiana*, *Momordica grosvenori*, sucralose, xylitol, vanilla, chocolate, a fruit flavor and an artificial flavor.

In one of the embodiments, the aforementioned food is fermented milk. A method for preparing the fermented milk includes the following steps.

Step a: a milk source is mixed with water, homogenized and then sterilized to obtain a premix.

Specifically, the milk source includes at least one of fresh milk, skimmed milk powder and whole milk powder. Sterilization conditions are as follows: 120° C.-122° C. for 250 s-350 s, and of course, after sterilization, it needs to be cooled so that the temperature of the premix is 40° C.-45° C.

Step b: the premix is added with an activated *Lactobacillus reuteri* strain for fermentation, so as to prepare a fermentation-treated product.

Specifically, the fermentation temperature is 40° C.-45° C.; and the fermentation time is 8 h-12 h.

Step c: the fermentation-treated product of the step b is cooled, and mixed with the *Lactobacillus reuteri* again to obtain fermented milk with high content of the *Lactobacillus reuteri*.

The fermented milk obtained by the aforementioned method for preparing fermented milk has high content and activity of the aforementioned *Lactobacillus reuteri* and a high nutritional value, and can be further used for the treatment or prevention of disease symptoms.

Based on the functions of the aforementioned *Lactobacillus reuteri* or the aforementioned composition, an embodiment of the present invention further provides a drug, and a raw material for preparing the drug includes the aforementioned *Lactobacillus reuteri* or the aforementioned composition, and a pharmaceutically acceptable excipient.

Based on the functions of the aforementioned *Lactobacillus reuteri* or the aforementioned composition, an embodiment of the present invention further provides a method for preventing or treating intestinal leakage and/or allergic reactions, which includes taking the aforementioned composition or a product prepared from the aforementioned composition as a raw material at a dosage of $3.0 \times 10^6$ CFU/kg body weight/day to $1.2 \times 10^{11}$ CFU/kg body weight/day, based on the number of probiotics in the composition. Further, based on the number of microorganisms in the composition, the dosage is $1.0 \times 10^6$ CFU/kg body weight/day-$6.0 \times 10^{10}$ CFU/kg body weight/day.

SPECIFIC EXAMPLES

The following will be described in detail with specific examples. Unless otherwise specified, the following examples do not include other components except inevitable impurities. Unless otherwise specified, reagents and instrument used in the examples are all conventional choices in the art. The experimental methods without specific conditions in the examples are implemented according to conventional conditions, for example those described in literatures and books or methods recommended by manufacturers.

Example 1

A strain was isolated from the milk of a healthy woman by anaerobic culture. It was identified by 16S rRNA for full-length sequencing and identified by mass spectrometry, and it was a new strain belonging to *Lactobacillus reuteri*, named as *Lactobacillus reuteri* LR99 (referred to as "LR99" or "LR-99" for short). The strain had been deposited on Dec. 31, 2020 in the China General Microbiological Culture Collection Center (abbreviated as CGMCC, address: Institute of Microbiology, Chinese Academy of Sciences, No. 3 1st Beichen West Rd., Chaoyang District, Beijing, 100101), classified and named as *Lactobacillus reuteri*, with the accession number of CGMCC No. 21577.

1. Taxonomic Characteristics of *Lactobacillus reuteri* LR99:

(1) The *Lactobacillus reuteri* LR99 was observed under a microscope, and the results were shown in FIG. 1.

(2) The physical and chemical test results were shown in Tables 1 and 2.

TABLE 1

| | Basic situation of bacterial cells | | | | | | | |
|---|---|---|---|---|---|---|---|---|
| | Gram staining | Spores | Motility | Catalase | Oxidase | Oxygen | $H_2O_2$ | Optimum temperature |
| Result | + | – | – | – | – | – | – | 37° C. |

It could be seen from Table 1 that *Lactobacillus reuteri* LR99 was a Gram-positive bacterium, which did not form spores, had no motility, was negative for catalase and oxidase, and was anaerobic. The suitable culture temperature was 37° C.

TABLE 2

| | Detection of carbohydrate metabolism ability | | | | | | | | | |
|---|---|---|---|---|---|---|---|---|---|---|
| | Ribose | Trehalose | Xylose | Maltose | Lactose | Raffinose | Inulin | Starch | Mannose | Melibiose |
| Result | + | – | + | + | + | + | + | + | + | + |
| | Melezitose | Galactose | Fructose | Cellobiose | Sucrose | L-arabinose | Sodium gluconate | Mannitol | Sorbitol | Salicin |
| Result | – | + | – | – | + | + | – | – | – | + |

"+" in Table 2 represented that it could be metabolized; and "–" represented that it could not be metabolized.

It could be seen from Table 2 that the *Lactobacillus reuteri* LR99 could metabolize ribose, xylose, maltose, lactose, raffinose, inulin, starch, mannose, melibiose, galactose, sucrose, L-arabinose and salicin, but it could not metabolize trehalose, melezitose, fructose, cellobiose, sodium gluconate, mannitol and sorbitol.

2. Tolerance of *Lactobacillus reuteri* LR99 in Artificial Gastric Juice and Intestinal Juice:

The tolerance of the *Lactobacillus reuteri* LR99 in artificial gastric juice and intestinal juice was tested, and meanwhile *Lactobacillus reuteri* DSM17938 currently preserved in the laboratory, which was isolated from commercially available probiotic products and had excellent acid resistance and could survive through the gastrointestinal tract, was used as a control.

The detection results of the survival rates of the *Lactobacillus reuteri* DSM17938 and the *Lactobacillus reuteri* LR99 in the artificial gastric acid (pH=3) and the artificial intestinal juice (pH=8) were shown in Table 3.

As could be seen from Table 3, the survival rate of viable *Lactobacillus reuteri* DSM17938 was 71.2% when it was treated in the artificial gastric juice for 1 h and 33.1% when it was treated in the artificial gastric juice for 1.5 h; while the viable survival rate of the *Lactobacillus reuteri* LR99 was 93.1% when it was treated in the artificial gastric juice for 1 h and 69.7% when it was treated in the artificial gastric juice for 1.5 h, which indicated that the *Lactobacillus reuteri* LR99 had relatively good gastric acid tolerance, and mostly it could successfully reach the intestinal tract through the stomach to play its role.

As could be seen from Table 3, the viable survival rate of the *Lactobacillus reuteri* DSM17938 was 25.8% after it was treated in the artificial intestinal juice (pH=8) for 1 hour, and 18.5% after it was treated in the artificial intestinal juice for 2 hours; while the viable survival rate of the *Lactobacillus reuteri* LR99 was 48.8% after it was treated in the artificial intestinal juice for 1 hour, and 37.8% after it was treated in the artificial intestinal juice for 2 h.

The aforementioned results showed that the *Lactobacillus reuteri* LR99 could still survive well after being digested by the artificial gastric juice and intestinal juice. Compared with commercial strains, the *Lactobacillus reuteri* LR99 had better digestive juice tolerance and could survive and colonize smoothly in the intestinal tract.

3. Toxicity experiment and safety detection of *Lactobacillus reuteri* LR99:

TABLE 3

| | Artificial gastric juice (pH = 3) | | | Artificial intestinal juice (pH = 8) | | |
|---|---|---|---|---|---|---|
| Testing conditions | 0 h ($10^9$ CFU/mL) | 1 h ($10^9$ CFU/mL) | 1.5 h ($10^9$ CFU/mL) | 0 h ($10^9$ CFU/mL) | 1 h ($10^9$ CFU/mL) | 2 h ($10^9$ CFU/mL) |
| LR99 bacterial density | 3.2 | 2.98 | 2.23 | 3.2 | 1.56 | 1.21 |
| Survival rate of LR99 (%) | 100 | 93.1 | 69.7 | 100 | 48.8 | 37.8 |
| DSM17938 bacterial density | 2.6 | 1.85 | 0.86 | 2.6 | 0.67 | 0.48 |
| Survival rate of DSM17938 (%) | 100 | 71.2 | 33.1 | 100 | 25.8 | 18.5 |

(1) *Lactobacillus reuteri* LR99 was inoculated into a MRS liquid culture medium, and subjected to anaerobic culture at 37° C. for 48 hours. The number of viable *Lactobacillus reuteri* LR99 in the culture medium was counted to be 3.2×10⁹ CFU/mL, and then the stock solution of the culture solution was continuously given to mice (healthy male BALB/C mice of 6-8 weeks old and weighed 16-18 g, maintained at room temperature (25±2° C.), relative humidity (55±2) %, and illuminated with light for 12 h/12 h, and having free access to food and water) at a ratio of 20.0 mL/kg body weight. The mice were observed thereafter for 7 days. Meanwhile, the mice were administrated with 20.0 mL/kg body weight of the MRS liquid medium through gavage to serve as a control group.

The results showed that compared with the control group, no toxic reaction or death in the culture stock solution of the *Lactobacillus reuteri* LR99 was observed, and there was no statistical difference ($p>0.05$) in the weight gain of the mice in the two groups of mouse subjects.

(2) The antibiotic sensitivity of the *Lactobacillus reuteri* LR99 was evaluated by employing the method of SN/T 1944-2007 "Detection of antimicrobial resistance of the bacteria in animal and animal products".

The results showed that the *Lactobacillus reuteri* LR99 was sensitive to Ampicillin, Penicillin G, Erythromycin, Chloramphenicol, Clindamycin, Vancomycin and Tetracycline, etc. It met the requirements of the European Food Safety Authority's evaluation standard for antimicrobial resistance of edible bacteria; and the *Lactobacillus reuteri* LR99 did not contain exogenous antibiotic resistance genes, so it was safe to eat.

Example 2

This example was used for illustrating the high-density fermentation of the *Lactobacillus reuteri* LR99 and a process for preparing freeze-dried powder.

(1) the *Lactobacillus reuteri* LR99 was anaerobically cultured in an improved MRS medium to obtain a strain for fermentation.

(2) the *Lactobacillus reuteri* LR99 strain was subjected to three times of activation culture each at a temperature of 37° C. for a time between 16 h-18 h to improve the strain viability. After the strain was activated, the growth curve of the *Lactobacillus reuteri* LR99 strain was detected, and the results were shown in Table 4.

TABLE 4

| Time | pH | OD |
| --- | --- | --- |
| 5 h | 4.48 | 4.5 |
| 6 h | 4.31 | 4.71 |
| 7 h | 4.17 | 6.05 |
| 8 h | 4.06 | 6.97 |
| 9 h | 3.73 | 7.26 |
| 10 h | 3.67 | 7.78 |

According to the detection results of the growth curve of the *Lactobacillus reuteri* LR99, the time point when the *Lactobacillus reuteri* LR99 reached the end of logarithmic growth, is a fermentation harvest point. The seeds of the *Lactobacillus reuteri* LR99 were cultured and harvested at the end of the logarithmic phase. The harvested seeds were refrigerated in a refrigerator at 4° C.

(3) Loading of a fermentation tank: An improved MRS culture medium is sterilized and then quickly cooled to 37° C., inoculated into a fermentation tank with an inoculation amount of 3% for fermentation, and the pH and OD values of the fermentation broth were detected every hour. When the fermentation is conducted until the pH and OD value are relatively flat, it indicates that the strain reaches the end of a logarithmic phase and is about to enter a stable phase, and the fermentation was completed. At this time the fermentation was completed, the temperature was immediately lowered, and the fermentation broth was centrifuged at low temperature. The bacterial cells are collected, washed with a phosphate buffer (PBS), emulsified with addition of a lyoprotectant (skimmed milk powder), and then freeze-dried under vacuum to obtain bacterial powder. The prepared freeze-dried bacterial powder was stored below −20° C. Upon detection, the number of viable bacteria was 2.75×10⁹ CFU/mL in the fermentation broth, 4.7×10¹⁰ CFU/mL in the emulsion, and 1.55×10¹¹ CFU/g in the freeze-dried powder.

Example 3

This example was used for illustrating the effect of *Lactobacillus reuteri* LR99 on improving intestinal leakage.

Lactic acid could be divided into type D and type L. Normal people only had L-lactic acid in the body. D-lactic acid was a metabolite of bacterial fermentation, which could be produced by various bacteria in the intestinal tract. Even after being ingested from a food, it was rarely absorbed into the blood under normal circumstances, and mammals did not have an enzyme system to degrade it quickly. When the permeability of intestinal mucosa increased, a large amount of D-lactic acid produced by the bacteria in the intestinal tract enters the blood through the damaged mucosa, which increased the level of D-lactic acid in the blood. Monitoring the level of D-lactic acid in the blood could reflect the degree of intestinal mucosal damage and permeability changes in time, and could be used as an auxiliary evaluation of intestinal infection, endotoxemia, systemic inflammatory responses, recurrent fever and vomiting, etc.

Lipopolysaccharide (LPS), also known as bacterial endotoxin, was a component of the cell wall of a Gram-negative bacterium. LPS was a toxic substance to animals. The structure of the LPS could be divided into three parts: a glycolipid domain-lipid A, a sugar residue short chain-core oligosaccharide, and a hypervariable polysaccharide domain-O antigen. The structure of the LPS determined its agonist/antagonist effect on TLR4. In vivo, LPS bound to a TLR4/MD-2 receptor complex, and activated different signaling pathways through Myd88-dependent or TRIF-dependent pathways. The expression amount of TLR in intestinal epithelial cells at different parts was different, which could prevent the inflammatory response caused by LPS and fight against pathogenic bacteria.

LPS was related to onset of many diseases, for example intestinal diseases such as IBD and enterocolitis, etc., and even Parkinson's disease and Alzheimer's disease etc. LPS could not only enter the blood, but also enter and stay in the brain for life, which might cause Alzheimer's disease.

The level of LPS in the blood could reflect the permeability of the intestinal tract. A normal intestinal barrier did not allow LPS to enter. The higher level of LPS in the blood indicated that intestinal bacteria or LPS had migrated to the blood, indicating that the increase of intestinal permeability increased the probability of intestinal leakage symptoms. The content of LPS in the blood could also indicate inflammatory responses and stress states. Too much LPS could cause abnormity of a human immune system, occurrence of chronic or acute inflammatory responses, occurrence of acute inflammation such as fever and pain, etc. It could be used as an auxiliary evaluation of intestinal infection, endotoxemia, systemic inflammatory responses, repeated fever, vomiting, mental diseases, stress reactions, etc.

Any stress reaction that led to the increase of intestinal permeability, both psychological and physiological, might potentially lead to bacterial translocation. The bacterial translocation referred to that viable intestinal bacteria entered the body from the intestinal tract through epithelial mucosa. The bacteria could enter the lymphatic system through mesenteric lymph nodes and circulate throughout the body. The bacteria could enter the blood circulation and cause bacteremia. It could also be located in an organization. The bacterial translocation could lead to intestinal bacterial overgrowth, intestinal injury and even shock.

The intestinal permeability to the Lactobacillus reuteri LR99 was evaluated by the contents of D-lactic acid and LPS in mouse serum, specifically as follows:

12 C57BL/6J mice of 6 weeks old, with 3 mice in each cage, were raised to have free access to food and water. The growing environment conditions of the mice were as follows: an ambient temperature of (23±2° C.), the relative humidity of (50±10) %, and a illumination mode of (12 h darkness/12 h illumination). After the mice adapted to the environment for one week, they were randomly divided into a control group and a probiotic group. The mice in the probiotic group were given a probiotic formulation (consisting of the freeze-dried powder of the Lactobacillus reuteri LR99 prepared in Example 2 and maltodextrin) by gavage at a dosage of 10 billion CFU/mouse/day; and meanwhile, the mice in the control group were given the same amount of a placebo (maltodextrin) by gavage.

From week 2, the mice were fed with the placebo or probiotic, and at the same time, each group was given a combined stress stimulation of noise and lighting in the night.

The mice in each group were fed by gavage and raised for six weeks, and blood was collected from the tail vein tip thereof. The blood was centrifuged at 3,000 g for 15 minutes. The contents of D-lactic acid and LPS in the serum were detected by employing an intestinal barrier function analysis system (JY-DLT, Beijing ZhongSheng JinYu Diagnosis Technology Co., Ltd.) according to the operating instructions. Then, the contents of D-lactic acid and LPS in the serum of the mice in each group were processed by SPSS statistical software, and the obtained data was expressed as mean±standard deviation. Independent sample test was used for comparison among groups, and it was considered that the difference was statistically significant when $p<0.05$. The results were shown in FIG. 2.

Figure 2:
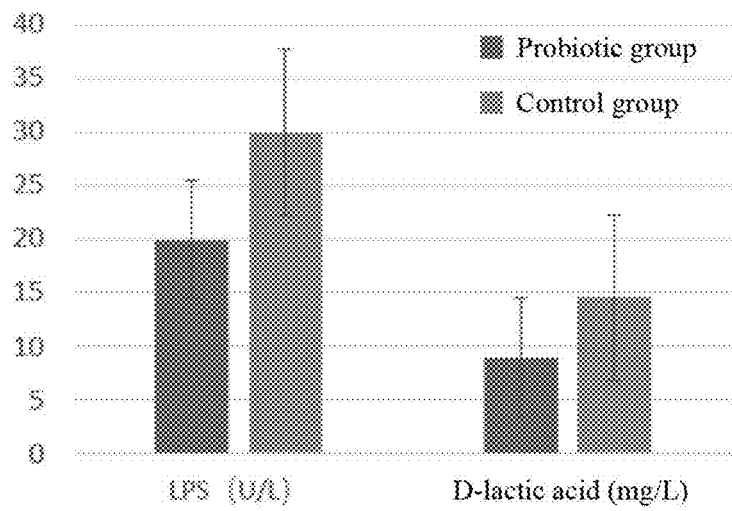
FIG. 2 shows the improvement of intestinal leakage after a probiotic or placebo is taken in Example 3.

As could be seen from FIG. 2, compared with the control group, the levels of LPS and D-lactic acid in the probiotic group decreased significantly ($p<0.05$). It showed that stress stimulation led to the increase of intestinal permeability, and the probiotic could reduce intestinal permeability and reduce the risks of endotoxemia and systemic inflammatory responses, etc.

Example 4

This example was used for illustrating the promoting effect of Lactobacillus reuteri LR99 on an immune system.

In an animal model and human studies, the probiotic affected the differentiation of CD4+ T cells to regulate allergic diseases. The probiotic could inhibit allergic diseases such as asthma, atopic dermatitis, allergic rhinitis, food allergy and urticaria, etc. by reducing Th2 cytokines (IL-4, IL-5, IL-13, etc.), reducing IgE, increasing IL-10 and promoting Treg differentiation, etc. It had been found by researches that certain intestinal flora could metabolize tryptophan into indole-3-ethanol, indole-3-pyruvate or indole-3-acetaldehyde, which could improve the barrier function of the intestinal tract. In vivo, the tryptophan metabolites could inhibit the increase of intestinal barrier permeability.

In order to test whether the Lactobacillus reuteri LR99 could affect the differentiation of CD4+ T cells to regulate allergic diseases, 18 C57BL/6J mice of 6 weeks old, with 3 mice in each cage, were fed in groups and had free access to food and water. After the mice adapted to the ambient environment for one week, they were randomly divided into three groups, with 6 mice in each group. They were fed with the placebo (the control group), the Lactobacillus reuteri LR99 freeze-dried powder (with the number of final viable bacteria of $1\times10^9$ CFU/mouse) (the LR-99 group) and the Lactobacillus reuteri LR99 freeze-dried powder (with the number of final viable bacteria of $1\times10^9$ CFU/mouse)+L-tryptophan (with a mass concentration of 0.24%) (the L-tryptophan was available from Research Diets, the LR-99+tryptophan group) every day.

After fed for 4 weeks, the mice were sacrificed, and the intestinal tract and spleen were taken out. A single cell suspension of spleen was prepared by a mechanical destruction method to isolate T cells. The spleen was digested with 100 ng/ml of a collagenase D (Invitrogen) for DC separation. For flow cytometry, the following fluorophore labeled monoclonal antibodies were used: anti-CD8 (53-6.7) and anti-CD4 (GK1.5) available from BD Biosciences. For the separation of naive T cells, the single cell suspension was enriched with a "naive CD4+ T cell separation kit" (Miltenyi Biotec), and then sorted for CD4+ cells. The sample was treated by FACSCantoII (BD Biosciences). Fluorescence-activated cell sorting was conducted by FACSAria II (BD Biosciences), and the data was analyzed by FlowJo software (TreeStar). The results were shown in FIG. 3.

Figure 3:
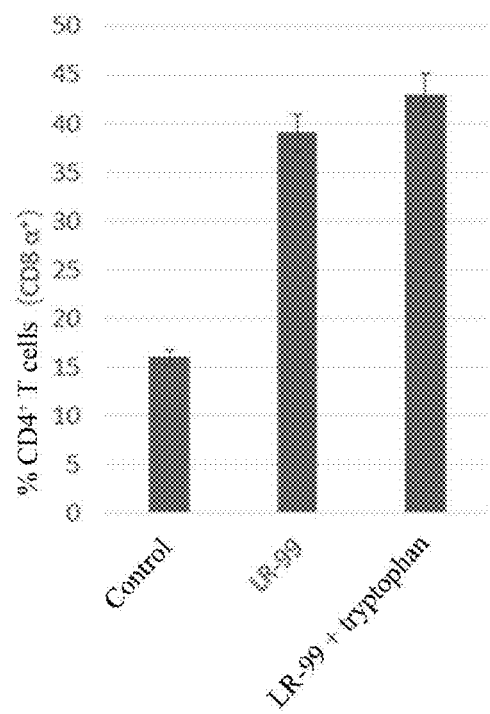
FIG. 3 shows the improvement of CD4+ T cells after a probiotic or placebo is taken in Example 4.

It could be seen from FIG. 3 that the Lactobacillus reuteri LR99 and the Lactobacillus reuteri LR99 could significantly promote differentiation of the CD4+ T cells after binding to tryptophan ($p<0.05$). Moreover, there was no significant difference in the differentiation of the CD4+ T cells between the Lactobacillus reuteri LR99 alone and the Lactobacillus reuteri LR99 combined with tryptophan ($p>0.05$).

Example 5

This example was used for illustrating the effect of LR99 on intestinal microbial composition.

(1) Extraction of DNA: DNAs of fecal flora were extracted from cecum contents collected after the mice in each group were sacrificed in Example 4 by a TIANmap fecal DNA kit (TIANGEN, catalog number DP328). The extracted DNA was quantitatively detected by an Qubit instrument. It was detected by 1% agarose gel electrophoresis: at a voltage of 100 V for 40 min. It was photographed and recorded by an UVI gel imaging system: DNA electrophoresis showed no impurity bands and tailing, which indicated that the purity of the DNA fragment was good and there was no obvious degradation. A proper amount of a sample was taken and put in a centrifuge tube and diluted to 1 ng/μL with sterilized water. The DNA was stored in a refrigerator at −20° C. for later use.

(2) Bacterial 16S rRNA gene amplification: Using diluted genomic DNA as a template, according to the selection of a sequencing region, specific primers with Barcodes were used. V3-V4 universal primers 341F (CCTACGGG-NBGCASCAG, SEQ ID No. 1) and 805R (GAC-TACNVGGGTATCTAATCC, SEQ ID No. 2) were employed to amplify the V3-V4 regions of the bacterial 16S rRNA gene. The DNA extracted from 100 ng of the sample was used for chain renaturation by PCR at 56° C., denatured at 94° C. for 4 minutes at first, and then the temperature was decreased at 94° C. for 30 seconds, 56° C. for 30 seconds and 72° C. for 1 minute for 30 cycles.

(3) Amplicon gene sequencing: The library was constructed with a library construction kit, the TruSeq DNA PCR-Free Library Preparation Kit available from Illumina. After the constructed library was qualified by Qubit quantification and library detection, the flora was sequenced with a Illumina HiSeq2500 PE250 sequencing platform.

(4) Processing and analysis of sequencing data: The original data of flora sequencing was imported into QIIME (2019.4), and denoised with DADA2 to obtain a representative amplicon variant (ASV), which was employed to construct a phylogenetic tree. After quality control, the filtered ASVs was aligned with the gene sequences in a Greengenes (V_13.5) database by a Naïve bayes classifier (NBC) method, and species annotation was made. In the analysis of Alpha and Beta diversity, the resampling depth was 10,000 sequences per sample to ensure enough sequences. In order to reduce the influence of too many species on the results, the statistical results were corrected by calculating a false discovery rate (FDR).

Figure 4:
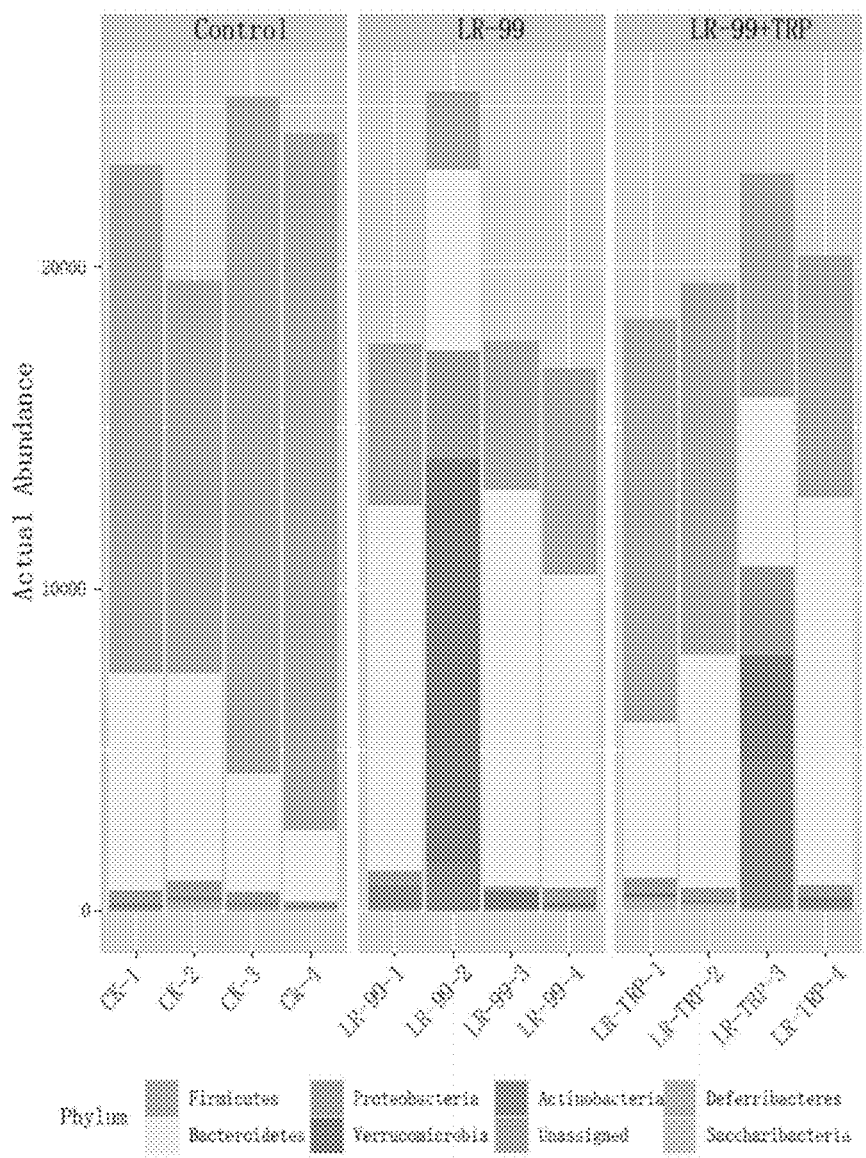
FIG. 4 shows a composition of intestinal flora at a phylum level after the probiotic or placebo is taken in Example 4.
Figure 5:
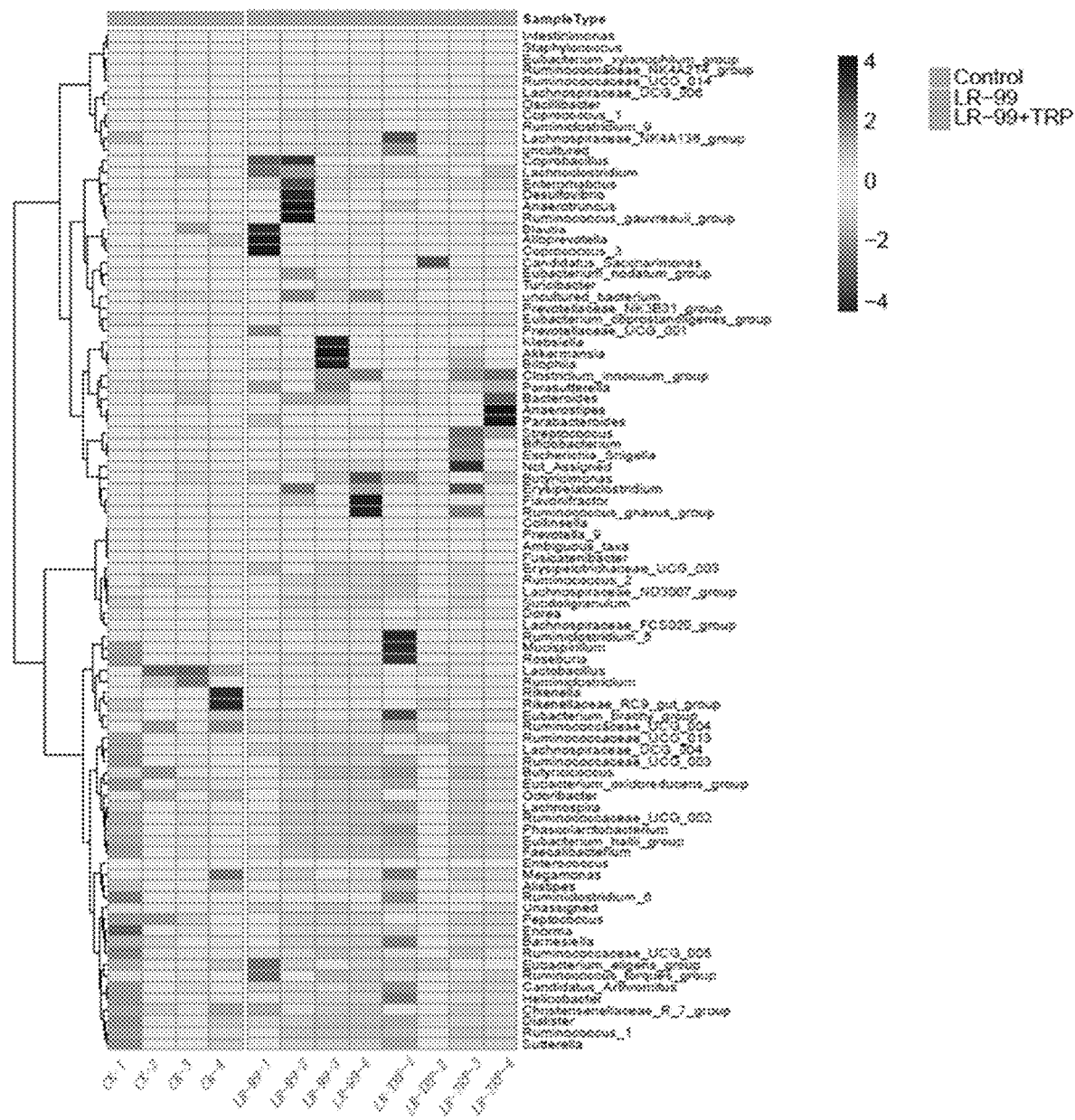
FIG. 5 is a heat map of intestinal flora at a genus level after the probiotic or placebo is taken in Example 4.
Figure 6:
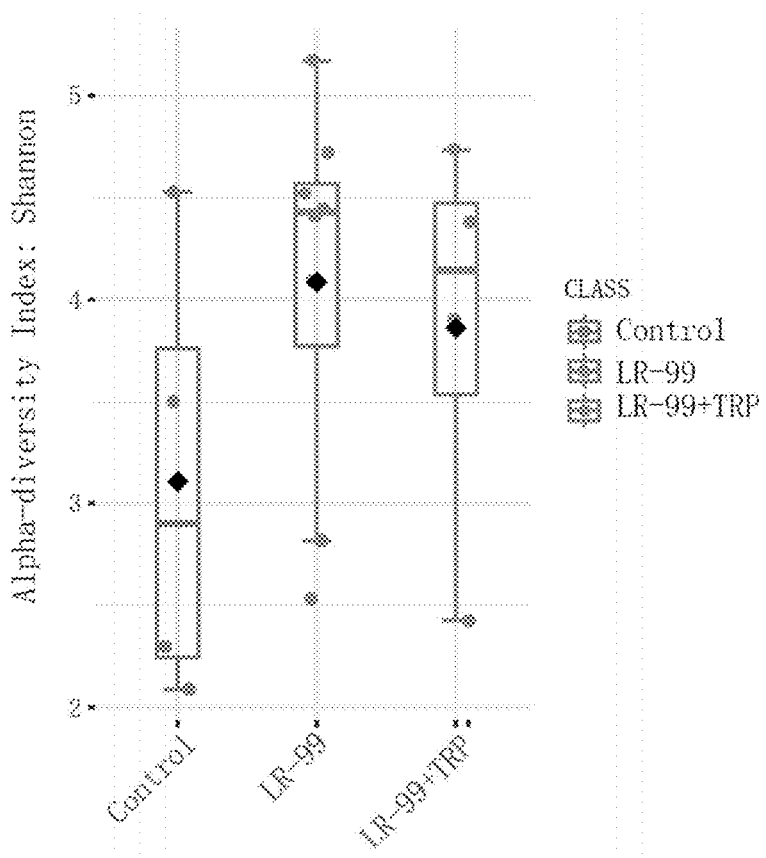
FIG. 6 shows the change of a Shannon index of intestinal flora after the probiotic or placebo is taken in Example 4.
Figure 7:
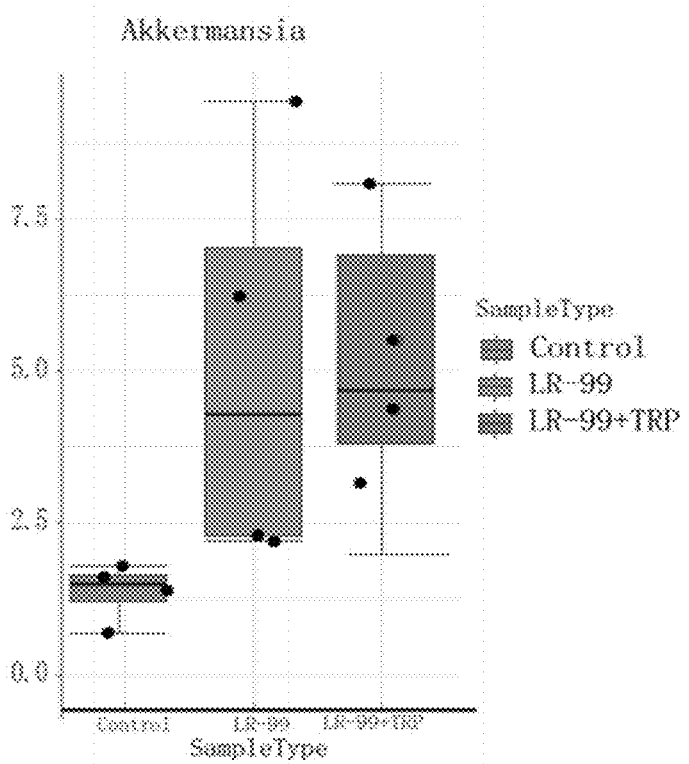
FIGS. 7-9 show the comparison of the composition of representative beneficial strains in the intestinal flora after the probiotic or placebo is taken in Example 4.
Figure 8:
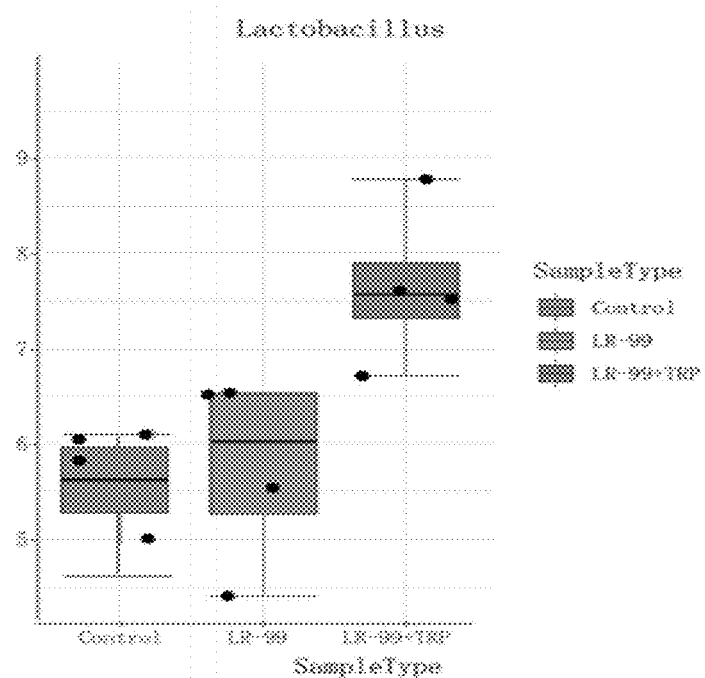
Figure 9:
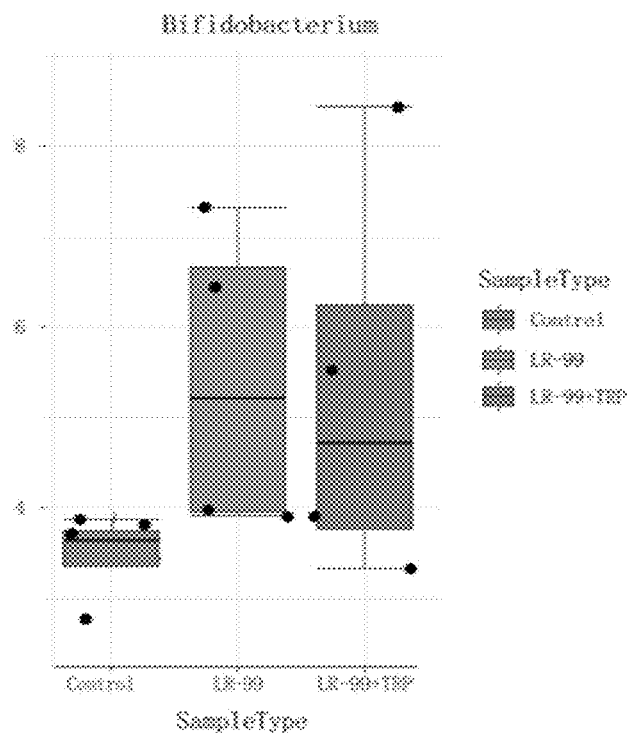

The results showed that at a phylum level, there were significant differences in intestinal flora among the control group, the probiotic group (LR99) and the probiotic combined with tryptophan group (LR99+TRP). Bacteroidetes in the control group was lower than that in the probiotic group (FIG. 4). The alpha diversity index of the probiotic group was also higher than that of the control group, and there was no significant difference in the Shannon index (p=0.45064 (Mann-Whitney Statistical)) (FIG. 5). Thermographic analysis showed that there were differences in flora composition among the three groups at a genus level (FIG. 6). At the genus level, there were many specific differential bacteria, wherein the *Lactobacillus, Bifidobacterium* and Akkermansia increased obviously after LR99 was used, and especially for the *Lactobacillus*, the addition of tryptophan seemed to promote its abundance (FIGS. 7-9).

Example 6

This example was used for illustrating the improvement of allergic symptoms of a child diagnosed with autism spectrum disorder (ASD) by the *Lactobacillus reuteri* LR99.

The child was a boy of 7 years old. The child was given it in the form of oral *Lactobacillus reuteri* LR99 freeze-dried powder (consisting of the *Lactobacillus reuteri* LR99 and a lyoprotectant) for 3 times a day, with 60 billion CFU each time, and for a dosing period of 30 days.

Before and after taking it, the child's intestinal and skin symptoms were recorded. Blood was collected to detect IgE and chronic food allergy. After 30 days, the child's symptoms of diarrhea and abdominal distension changed, the mucousy stool was improved, and several times of formed stools appeared. The frequency of defecation was changed from 2-3 times a day to once every 1-2 days. The symptoms of dermatitis were improved and scratching was reduced. At the same time, the number of times parents reported the children's irritability decreased, and his vocabulary increased slightly. The results of the blood test showed that IgE decreased from 572.2 IU/mL before taking to 368.7 IU/mL. The chronic food allergy test showed that the indexes of eggs and milk decreased slightly. Parents chose to continue to take it, and they are still observing and recording the continuous improvement.

The technical features of the aforementioned examples can be arbitrarily combined. To simplify the description, we do noy describe all possible combinations of the technical features in the aforementioned examples. However, as long as there is no contradiction in the combination of these technical features, it should be considered as the scope stated in this specification.

The examples described above are merely illustrative of several embodiments of the present invention, the description of them is more specific and detailed, but cannot be construed as limiting the scope of the present invention accordingly. It should be noted that, several variations and modifications can be made by those of ordinary skills in the art, under the premise of not departing from the concept of the present invention, and these variations and modifications all fall within the claimed scope of the present invention. Therefore, the claimed scope of the patent of the present invention shall be determined by the appended claims.

What is claimed is:

1. A freeze-dried powder comprising a *Lactobacillus reuteri* LR99 having an accession number of CGMCC No. 21577, wherein the *Lactobacillus reuteri* LR99 is a living bacterium or an inactivated bacterium, wherein the freeze-dried powder is prepared by mixing bacterial cells of the *Lactobacillus reuteri* LR99 and other probiotics with a lyoprotectant, a prebiotic, and an emulsifier, and then freeze-drying the mixture under vacuum.

2. The freeze-dried powder according to claim 1, wherein the other probiotics are selected from the group consisting of *Lactobacillus, Bifidobacterium, Streptococcus thermophilus, Lactococcus, Propionibacterium, Leuconostoc, Staphylococcus, Bacillus, Pediococcus, Escherichia coli* and yeasts, the *Propionibacterium* is selected from the group consisting of *Propionibacterum freudenreichii* subsp. *shermani* and *Propionibacterium acidipropionici;* the *Leuconostoc* is *Leuconostoc mesenteroides* subsp. *mesenteroides;* the *Staphylococcus* is selected from the group consisting of *Staphylococcus vitulinus, Staphylococcus carnosus,* and *Staphylococcus* xylosus;

the *Bacillus* is *Bacillus coagulans;* the *Pediococcus* is selected from the group consisting of *Pediococcus acidilactici* and *Pediococcus pentosaceus*; and the *Escherichia coli* is Nissle1917.

3. The freeze-dried powder according to claim 1, wherein the prebiotic is selected from the group consisting of inulin, an artichoke extract, a chicory root extract, a jerusalem artichoke root extract, a fructooligosaccharide, a galactooligosaccharide, an isomalto-oligosaccharide, a xylooligosaccharide, a stachyose, a mannose oligosaccharide, an arabinose oligosaccharide, resistant dextrin and resistant starch.

4. A lozenge comprising the freeze-dried powder according to claim 1, and a pharmaceutically acceptable excipient.

5. A tablet comprising the freeze-dried powder according to claim 1, and a pharmaceutically acceptable excipient.

6. A tablet or a lozenge comprising the freeze-dried powder according to claim 2, and a pharmaceutically acceptable excipient.

7. A tablet or a lozenge comprising the freeze-dried powder according to claim 3, and a pharmaceutically acceptable excipient.

* * * * *

SEQUENCE LISTING

```
<160> NUMBER OF SEQ ID NOS: 2

<210> SEQ ID NO 1
<211> LENGTH: 17
<212> TYPE: DNA
<213> ORGANISM: Artificial Sequence
<220> FEATURE:
<223> OTHER INFORMATION: synthesized
<220> FEATURE:
<221> NAME/KEY: misc_feature
<222> LOCATION: (9)..(9)
<223> OTHER INFORMATION: n is a, c, g, or t

<400> SEQUENCE: 1
cctacgggnb gcascag                                                  17

<210> SEQ ID NO 2
<211> LENGTH: 21
<212> TYPE: DNA
<213> ORGANISM: Artificial Sequence
<220> FEATURE:
<223> OTHER INFORMATION: synthesized
```

```
<220> FEATURE:
<221> NAME/KEY: misc_feature
<222> LOCATION: (7)..(7)
<223> OTHER INFORMATION: n is a, c, g, or t

<400> SEQUENCE: 2
gactacnvgg gtatctaatc c                                              21
```